United States Patent
Wang et al.

(10) Patent No.: US 8,509,626 B2
(45) Date of Patent: Aug. 13, 2013

(54) SYSTEM AND METHOD FOR REDUCING MUTUAL LEAKAGE BETWEEN DISTRIBUTED FEEDBACK LASER AND ELECTRO-ABSORPTION MODULATOR IN INTEGRATED ELECTRO-ABSORPTION MODULATED LASER

(75) Inventors: Jun Wang, Warrington, PA (US); Richard A. Meier, Abington, PA (US)

(73) Assignee: General Instrument Corporation, Horsham, PA (US)

( * ) Notice: Subject to any disclaimer, the term of this patent is extended or adjusted under 35 U.S.C. 154(b) by 471 days.

(21) Appl. No.: 12/976,642

(22) Filed: Dec. 22, 2010

(65) Prior Publication Data

US 2012/0163833 A1    Jun. 28, 2012

(51) Int. Cl.
*H04B 10/04*    (2011.01)

(52) U.S. Cl.
USPC ........... 398/185; 398/182; 398/183; 398/192; 398/194

(58) Field of Classification Search
USPC ................ 398/182, 183, 185, 192–196, 198; 372/20
See application file for complete search history.

(56) References Cited

U.S. PATENT DOCUMENTS

| | | | |
|---|---|---|---|
| 5,315,426 A * | 5/1994 | Aoki | 398/147 |
| 5,400,417 A * | 3/1995 | Allie et al. | 385/2 |
| 5,477,368 A * | 12/1995 | Eskildsen et al. | 398/147 |
| 5,706,117 A | 1/1998 | Imai et al. | |
| 5,892,607 A * | 4/1999 | Atlas | 398/201 |
| 6,151,145 A * | 11/2000 | Srivastava et al. | 398/1 |
| 6,473,214 B1 * | 10/2002 | Roberts et al. | 398/183 |
| 7,031,619 B2 * | 4/2006 | DeCusatis et al. | 398/196 |
| 7,050,388 B2 | 5/2006 | Kim et al. | |
| 7,271,948 B1 * | 9/2007 | Wang et al. | 359/334 |
| 7,349,637 B1 * | 3/2008 | Frederiksen, Jr. et al. | 398/194 |
| 7,974,319 B2 * | 7/2011 | Deladurantaye et al. | 372/6 |
| 8,112,003 B2 * | 2/2012 | Kozato | 398/198 |
| 8,340,531 B2 * | 12/2012 | Wang | 398/194 |
| 2003/0160148 A1 * | 8/2003 | Yao et al. | 250/205 |
| 2004/0028414 A1 * | 2/2004 | Quesenberry et al. | 398/141 |
| 2004/0156632 A1 * | 8/2004 | Lee et al. | 398/26 |
| 2005/0058460 A1 * | 3/2005 | Wang | 398/195 |
| 2006/0018667 A1 * | 1/2006 | Lee et al. | 398/186 |
| 2008/0075469 A1 * | 3/2008 | Frederiksen et al. | 398/183 |
| 2008/0150484 A1 * | 6/2008 | Kimball et al. | 320/125 |

* cited by examiner

*Primary Examiner* — Daniel Washburn
*Assistant Examiner* — Hibret Woldekidan
(74) *Attorney, Agent, or Firm* — Lori Anne D. Swanson

(57) ABSTRACT

A device is provided for use with a dither tone signal and an information signal. The device includes a laser diode, an electro-optic modulator, a first filter and a second filter. The laser diode can output a first light signal, whereas the electro-optic modulator can transmit a second light signal. The first filter can generate a first filtered signal based on the information signal. The second filter can generate a second filtered signal based on the dither tone signal. The first light signal is based on the dither tone signal, the information signal and the first filtered signal. The second light signal is based on the first light signal, the information signal, the dither tone signal and the second filtered signal. The filtered signals reduce or cancel the undesired leaked/interfering signals.

22 Claims, 3 Drawing Sheets

SYSTEM AND METHOD FOR REDUCING MUTUAL LEAKAGE BETWEEN DISTRIBUTED FEEDBACK LASER AND ELECTRO-ABSORPTION MODULATOR IN INTEGRATED ELECTRO-ABSORPTION MODULATED LASER

BACKGROUND

Amplitude modulated vestigial side band cable TV (CATV) systems operating at a wavelength of 1.55 um offer advantages over those at 1.3 um because of low fiber loss and availability of erbium-doped fiber amplifiers. For long link or trunk link applications at 1.55 um however, directly modulated transmitters are not normally used because the interaction laser chirp and fiber dispersion generates an intolerable signal interference. Laser chirp also induces some noise because of double Rayleigh backscattering (DRB), which becomes more detrimental as transmission link lengthens. Although dispersion compensation modules (DCM) can be used to compensate for the fiber dispersion, use of DCM adds the inconvenience of network design, insertion loss and cost. As a result, transmitters based on lithium niobate Mach-Zehnder external modulators (LN EM) are used because of very low chirp in amplitude modulated vestigial side band commercially. LN EM offers high performance at premium cost and complexity in manufacturing. LN EM are also widely used in digital applications also for their low chirp.

Integrated electro-absorption modulated lasers (EML) also have low chirp and they are compact and much cheaper when compared to LN EM. However EMLs are not widely used in analog CATV applications due to the fact that they are usually not linear enough for analog video signal modulation.

What is needed is a proper distortion correction technique, so EML components can generate acceptable distortion performance for typical analog applications. This allows analog CATV transmitter design with a more compact and much lower cost for trunk transmissions at a wavelength of 1.55 um.

Because the laser diode and electro-optic modulator are built on the same substrate for an EML, they can be packaged in a small form factor. As a result, there may exist leakage between the laser diode and the electro-optic modulator, when either the dithering signal or the electro-optic modulator signal or both are modulated.

When the electro-optic modulator is an electro-absorptive (EA) modulator, leakage from laser diode and the electro-optic modulator can also be generated through EA absorption because the absorbed light at the EA is converted into photocurrent. The photocurrent can in turn affect the EA bias. The dithering bearing light is therefore "leaked" to the EA modulator.

Typically, EMLs are operated to transmit a digital information signal, meaning that the information input to the EML for transmission is input in one of two states, a low state and a high state. Digital input allows for robust performance because noise in the system must be above a threshold value to have an impact on the system. The robust noise performance allows EMLs to transmit a digital information signal with little effect from any mutual leakage in the input signals.

When an EML transmits an analog information signal, signal interference resulting from leakage may be large enough to distort the output of the EML making an EML less useful in such a situation.

What is needed is system and method for reducing or cancelling mutual leakage in an electro-absorption modulated laser generated from input signals.

BRIEF SUMMARY

The present invention provides a system and method for reducing mutual leakage in an electro-absorption modulated laser generated from input signals.

In accordance with an aspect of the present invention, a device is provided for use with a dither tone signal and an information signal. The device includes a laser diode, an electro-optic modulator, a first filter and a second filter. The laser diode can output a first light signal, whereas the electro-optic modulator can transmit a second light signal. The first filter can generate a first filtered signal based on the information signal. The second filter can generate a second filtered signal based on the dither tone signal. The first light signal is based on the dither tone signal, the leaked information signal and the first filtered signal. The second light signal is based on the first light signal, the information signal, the leaked dither tone signal and the second filtered signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1A:
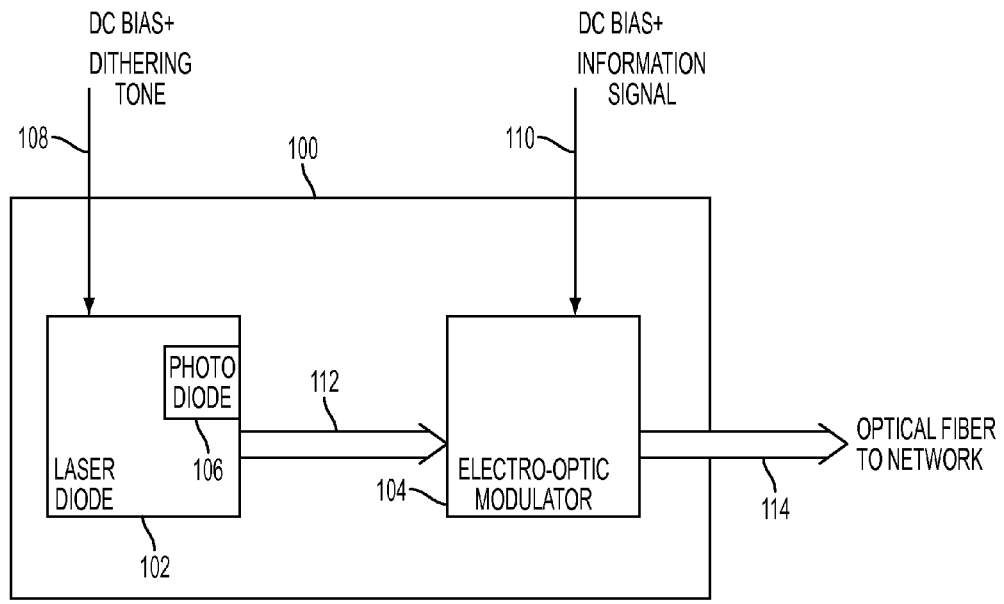
FIG. 1A illustrates an example electro-absorption modulated laser operating in an ideal situation.

In accordance with an aspect of the present invention, a system and method are provided for reducing mutual leakage in an electro-absorption modulated laser (EML). Mutual leakage in an EML occurs when input signals to the EML intended for components internal to the EML electrically mix/interfere with and influence unintended components internal to the EML. For example, an example EML may contain a laser diode capable of receiving a dithering tone and an electro-optic modulator capable of receiving a light signal from the laser diode and an information signal. Mutual leakage would result in the information signal intended for the electro-optic modulator being influenced by the input dithering tone and the light signal generated by the laser diode. Additionally, mutual leakage would result in the dithering tone being influenced by the input information signal. The mutual leakages can adversely degrade the quality of the signal that is carried on the modulated output light of the electro-optic modulator. Mutual leakage may be addressed by selectively combining and modifying the input signals to cancel the interference experienced by the components internal to the EML.

To address interference caused by the dithering tone interfering with the electro-optic modulator, a first signal modification device can be added to the system. The first signal modification device and the electro-optic modulator comprise a feedback loop that is used to eliminate the dithering tone noise signal. The first signal modification device takes as input the dithering tone and a first control signal which can be derived, for instance, from, the photocurrent of the electro-optic modulator. The first signal modification device is capable of creating a first noise cancelling signal based on the dithering tone and the first control signal from the electro-optic modulator. Non-limiting examples of signal modification by the first signal modification device include selective filtering and changing the phase and amplitude. The first noise cancelling signal is taken as input by the electro-optic modulator and combined with the dithering tone noise signal to cancel it.

To address interference caused by the information signal interfering with the laser diode, a second signal modification device can be added to the system. The second signal modification device and the laser diode comprise a feedback loop that is used to eliminate the information noise signal at the laser diode. The second signal modification device takes as input the information signal and a second control signal which can be derived, for instance, from the photocurrent of the photo diode integrated in the laser diode, showing the interference level. The second signal modification device is capable of creating a second noise cancelling signal based on the information signal and the second control signal from the photo diode. Non-limiting examples of signal modification by the second signal modification device include selective filtering and changing the phase and amplitude. The second noise cancelling signal is taken as input by the laser diode and combined with the information noise signal to cancel it.

Use of the method described above allows for an improvement in the quality of the information-carrying modulated light, transmission performance and transmission distance of an electro-absorption modulated laser.

FIG. 1A illustrates an example conventional electro-absorption modulated laser (EML) capable of transmitting an information signal via light output. The conventional EML shown in FIG. 1A is operating under ideal conditions, specifically, it is assumed that the EML in FIG. 1A is not experiencing any leakage between the input signals.

As illustrated in the figure, EML 100 includes a laser diode 102 and an electro-optic modulator 104. Laser diode 102 includes a photo diode 106. Photo diode 106 is used to monitor and regulate the operation of laser diode 102. Photo diode 106 is illustrated as integrated in laser diode 102, however photo diode 106 may be a separate, discrete component.

EML 100 is capable of receiving a dithering tone 108 and an information signal 110. Laser diode 102 is capable of receiving dithering tone 108 and is capable of outputting light signal 112. Electro-optic modulator 104 is capable of receiving information signal 110 and light signal 112 and is capable of outputting light signal 114.

The dithering signal at laser diode 102 may be used to suppress Stimulated Brillouin Scattering (SBS). SBS is a fiber nonlinearity phenomenon, which could limit the amount of light that can be launched into the fiber and create significant noise and distortions, especially when the light power entering the fiber is sufficiently high.

In operation, laser diode 102 creates light signal 112 from DC bias and dithering tone 108. Photo diode 106 is capable of measuring light signal 112.

Electro-optic modulator 104 is in the path of light signal 112 and is capable of modifying light signal 112 before it is output as light signal 114. Electro-optic modulator 104 modifies/modulates light signal 112 through electro-absorption using information signal 110. The amount of absorption is controlled by the EA DC bias and information signal 110.

In this example embodiment, electro-optic modulator 104 is taken to be an electro-absorptive modulator, but any type of electro-optic modulator may be used, non-limiting examples of which include electro-optic modulators capable of indicating information on an optical signal by modifying light intensity, phase, and frequency. The electro-absorptive modulator is capable of varying the amount of light that is transmitted through it in response to an input electrical signal. The input electrical signal is thus transmitted by varying the intensity of the light signal output from an electro-absorptive modulator.

When EML 100 is operated in a digital mode, an electro-absorptive modulator operating as electro-optic modulator 104 operates in one of two modes, a first mode where most of light signal 112 is transmitted through electro-optic modulator 104 representing, for example, a binary 1, and a second mode where most of light signal 112 is prevented from being transmitted through electro-optic modulator 104 representing, for example, a binary 0. In the second mode, an electro-absorptive modulator absorbs most of light signal 112, converting light signal 112 to electrical current. Electro-optic modulator 104 switches between the first and second modes in reference to information signal 110 to transmit information signal 110 as a digital light signal 114.

Figure 1B:
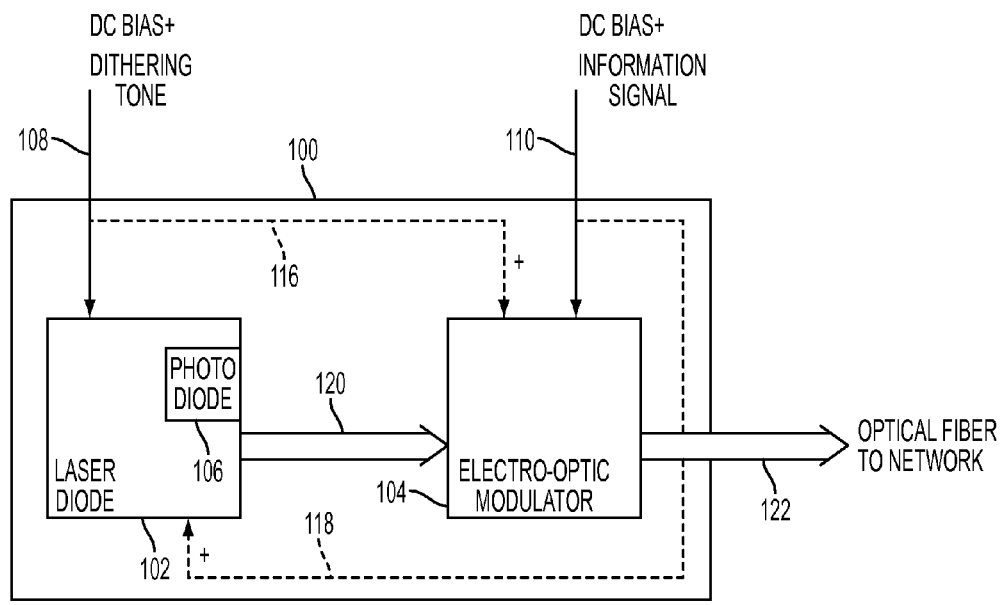
FIG. 1B illustrates an example electro-absorption modulated laser operating in a realistic situation.

FIG. 1B illustrates an example conventional electro-absorption modulated laser EML capable of creating a light signal operable to transmit an information signal via light output. The conventional EML shown in FIG. 1B is operating under more realistic conditions than the EML shown in FIG. 1A. Specifically, it is assumed that the EML in FIG. 1B is experiencing leakage in the input signals.

As illustrated in the figure, EML 100 includes a laser diode 102 and an electro-optic modulator 104. In this example, electro-optic modulator is an electro-absorptive modulator. Laser diode 102 includes a photo diode 106. Photo diode 106 is used to monitor and regulate the operation of laser diode 102. Photo diode 106 is illustrated as integrated in laser diode 102, however photo diode 106 may be a separate, discrete component.

EML 100 is capable of receiving a dithering tone 108 and an information signal 110. Laser diode 102 is capable of receiving dithering tone 108 and is capable of outputting light signal 120. Electro-optic modulator 104 is capable of receiving information signal 110 and light signal 120 and is capable of outputting light signal 122. Due to leakage, dithering tone leakage 116 is received by electro-optic modulator 104 and information signal leakage 118 is received by laser diode 102.

In operation, laser diode 102 should create light signal 120 from DC and dithering tone 108. Due to leakage, laser diode 102 is influenced by information signal leakage 118 and laser diode 102 creates light signal 120 from DC and dithering tone 108 and information signal leakage 118. Light signal 120 is thus not the ideal output signal. Photo diode 106 is capable of measuring light signal 120.

Electro-optic modulator 104 is in the path of light signal 120 and is capable of modifying light signal 120 before it is output as light signal 122. Electro-optic modulator 104 should modify/modulate light signal 120 using information signal 110. Dithering tone leakage 116 influences how electro-optic modulator 104 modifies light signal 120. Accordingly, as opposed to create light signal 122 based solely on information signal 110, electro-optic modulator 104 creates light signal based on information signal 110 and dithering tone leakage 116. Light signal 122 is thus not the ideal output signal.

Further, in an example embodiment where electro-optic modulator 104 is an electro-absorptive modulator, light signal 122 may be influenced by operation of electro-optic modulator 104. In operation, an electro-absorptive modulator absorbs a percentage of an input light signal and converts the light signal to an electrical current. The electrical current may then influence the operation of the electro-absorptive modulator. In the system illustrated in FIG. 1B, electro-optic modulator 104 would absorb part of light signal 120 which would be converted to electrical current. This electrical current would influence the operation of electro-optic modulator 104 such that light signal 122 would be created by modifying/modulating light signal 120 as influenced by DC bias, information signal 110, dithering tone leakage 116, and electrical current absorbed from light signal 120 by electro-optic modulator 104. Light signal 122 is thus not the ideal output signal.

EML 100 as shown in FIG. 1B will now be described in mathematical detail.

Light signal 120 with information signal leakage 118, ignoring or not applying dithering tone 108, is represented as $P_{LD}$ where $P_{LD}$ is $$P_{LD} = P_0 \left[ 1 + A * omi_{EM} \sum_{i=1}^{n} \cos(2\pi f_i t + \varphi_i + \theta_i) \right] \quad (1)$$

where A is an information signal leakage scaling factor, $omi_{EM}$ is the per carrier optical modulation index at the electro-absorption modulator 104, ($A*omi_{EM}$) is therefore the per carrier optical modulation index on laser diode 102 caused by information signal leakage 118, $f_i$ is the carrier frequency of information signal 110 at channel i and $\phi_i$ is the phase at the same channel and $\theta_i$ is a phase change at the same channel due to leakage path.

Light signal 120 is then modulated by electro-optic modulator 104 in relation to information signal 110 to generate light signal 122. Light signal 122 is represented as $P_{EML}$ where $P_{EML}$ is $$P_{EML} = LP_0 \left[ 1 + A * omi_{EM} \sum_{i=1}^{n} \cos(2\pi f_i t + \phi_i + \theta_i) \right] \quad (2)$$

$$\left[ 1 + omi_{EM} \sum_{i=1}^{n} \cos(2\pi f_i t + \phi_i) \right] =$$

$$LP_0 \left[ 1 + A omi_{EM} \sum_{i=1}^{n} \cos(2\pi f_i t + \varphi_i + \theta_i) + \right.$$

$$omi_{EM} \sum_{j=1}^{n} \cos(2\pi f_i t + \phi_i) +$$

$$\left. A(omi_{EM})^2 \sum_{j=1}^{n} \sum_{i=1}^{n} \cos(2\pi f_j t + \varphi_j + \theta_j) \cos(2\pi f_i t + \phi_i) \right]$$

where L is the attenuation caused by electro-optic modulator 104 and the coupling loss between the LD 102 and electro-optic modulator 104. Compared with the equation (1), the new factor at the right hand side of the equation (2) represents the modulation of information signal 110 at electro-optic modulator. It is seen that the last term in equation (2) causes the second order beat or CSO that is an undesired distortion in video modulation. The leakage thus degrades the signal quality.

Additionally, modulation at laser diode 102 generates frequency chirp whose electric field can be expressed as $$E_{LD} = \sqrt{P_0 \left[ 1 + A omi_{EM} \sum_{i=1}^{n} \cos(2\pi f_i t + \varphi_i) \right]} \quad (3)$$

$$\exp j \left[ 2\pi f_0 t + 2\pi \Delta f \int \sum_{i=1}^{n} \cos(2\pi f_i t + \varphi_i + \theta_i) dt + \varphi_{LD} \right]$$

where $\Delta f$ is FM frequency deviation, which is decided by chirp coefficient and modulation caused by information leakage 118 at laser diode 102, $\phi_{LD}$ is the optical carrier phase, which is random. The FM modulation in equation (3) creates additional laser linewidth, which represents the phase noise. It is well known that the DRB and fiber dispersion can convert phase noise to intensity noise which appears in the form of relative intensity noise (RIN). The leakage thus degrades the signal quality.

If dithering tone 108 is applied to EML 100, ignoring information signal leakage 118, light signal 122 can be represented as $$P_{EM} = \quad (4)$$

$$LP_{LD} [1 + omi_d F(f)] \left[ 1 + B * omi_d F(f) + omi_{EM} \sum_{i=1}^{n} \cos(2\pi f_i t + \varphi_i) \right]$$

where B is the dithering tone leakage scaling factor, $omi_d$ is optical modulation index of dithering tone 108 at laser diode 102; F(f) is dithering tone 108 and $B*omi_d$ is therefore the optical modulation index caused by leakage of the dithering tone leakage 116 at electro-optic modulator 104. It is seen from equation (4) that leakage from dithering tone leakage 116 thus affects electro-optic modulator 104. If information signal leakage 118 is included in equation (4), the signal may be further degraded.

Aspects of the present invention address the leakage issue discussed above with reference to FIG. 1B. Aspects of the present invention will now be further described with reference to FIGS. 2-4C.

Figure 2:
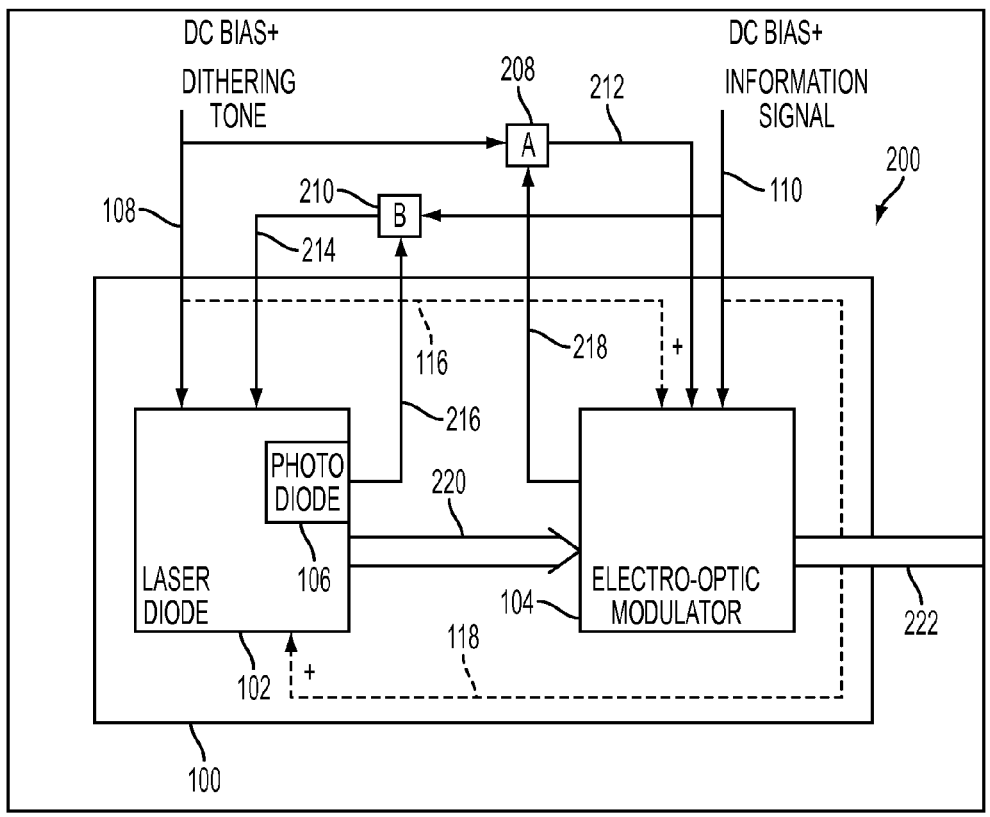
FIG. 2 illustrates an example electro-absorption modulated laser in accordance with the present invention.

FIG. 2 illustrates an example EML in accordance with an aspect of the present invention capable of cancelling mutual leakage in the EML.

As illustrated in the figure, system 200 includes EML 100, first signal modification device 208, and second signal modification device 210. EML 100 includes a laser diode 102 and an electro-optic modulator 104. In an example embodiment, electro-optic modulator 104 is an electro-absorptive modulator. Laser diode 102 includes a photo diode 106. Photo diode 106 is illustrated as integrated in laser diode 102, however photo diode 106 may be a separate, discrete component. Non-limiting examples of first signal modification device 208 and second signal modification device 210 include modification by phase adjustment, amplitude adjustment, and frequency adjustment.

EML 100 is capable of receiving dithering tone 108, information signal 110, a first noise cancelling signal 212, and a second noise cancelling signal 214. First signal modification device 208 is capable of receiving dithering tone 108 and first control signal 218 and is capable of outputting first noise cancelling signal 212. Second signal modification device 210 is capable of receiving information signal 110 and second control signal 216 and is capable of outputting second noise cancelling signal 214. Laser diode 102 is capable of receiving dithering tone 108, information signal leakage 118, and second noise cancelling signal 214 and is capable of outputting light signal 220. Photo diode 106 is capable of outputting second control signal 216. Electro-optic modulator 104 is capable of receiving information signal 110, dithering tone leakage 116, light signal 220, and first noise cancelling signal 212 and is capable of outputting light signal 222 and first control signal 218.

In operation, laser diode 102 ideally would create light signal 220, which is modulated by dithering tone 108. Due to leakage, laser diode 102 is influenced by information signal leakage 118 and laser diode 102 creates light signal 220, which is modulated by dithering tone 108 and information signal leakage 118.

In accordance with an aspect of the present invention, second signal modification device 210 can be used to reduce or cancel the effect of information signal leakage 118 on laser diode 102.

Second signal modification device 210 modifies information signal 110 to create second noise cancelling signal 214 in reference to second control signal 216. Photo diode 106 measures light signal 220 to create second control signal 216, which is used to measure the amount of interference caused by information signal leakage 118 on light signal 220. Second signal modification device 210 compares second control signal 216 to information signal 110 to determine the modification needed to create second noise cancelling signal 214. Control signal 216 may also be derived by monitoring other system parameters, such as second order distortion generated by information signal leakage 118.

Laser diode 102 uses second noise cancelling signal 214 to cancel the effect of information signal leakage 118. Laser diode 102 may then create light signal 220 based on the input signals from dithering tone 108, information signal leakage 118, and second noise cancelling signal 214. Photo diode 106 continues to measure light signal 220 and output second control signal 216. Second signal modification device 210 may then continue to adjust information signal 110 to create second noise cancelling signal 214 such that second noise cancelling signal 214 can more effectively reduce the effect of information signal leakage 118 on laser diode 102. The cancellation of the leakage 118 can be understood as removing the term associated with $A*omi_{EM}$ and $\Delta f$ in the equation (2) and equation (3). The equations then become the one describing the ideal laser operation.

In operation, electro-optic modulator 104 ideally would create light signal 222 by modifying light signal 220 in reference to information signal 110. Due to leakage, electro-optic modulator 104 is influenced by dithering tone leakage 116 and electro-optic modulator 104 creates light signal 222 by modifying light signal 220 in reference to information signal 110 and dithering tone leakage 116.

In accordance with an aspect of the present invention, first signal modification device 208 can be used to reduce or cancel the effect of dithering tone leakage 116 on electro-optic modulator 104.

First signal modification device 208 modifies dithering tone 108 to create first noise cancelling signal 212 in reference to first control signal 218. Electrical current output from electro-optic modulator 104 is influenced by light signal 220, information signal 110, and dithering tone leakage 116 to create first control signal 214, which is can be used to measure the amount of interference caused by dithering tone leakage 116 on light signal 222. First signal modification device 208 compares first control signal 218 to dithering tone 108 to determine the modification needed to create first noise cancelling signal 212.

Electro-optic modulator 104 receives first noise cancelling signal 212 to cancel the effect of dithering tone leakage 116. Electro-optic modulator 104 may then modify light signal 220 to create light signal 222 in reference to information signal 110, dithering tone leakage 116, and first noise cancelling signal 212. Electro-optic modulator 104 continues to output first control signal 218, which can be used to measure the effect of dithering tone leakage 116 on electro-optic modulator 104. First signal modification device 212 may then continue to adjust the modification made on dithering tone 108 to create first noise cancelling signal 212 such that first noise cancelling signal 212 can more effectively reduce the effect of dithering tone leakage 116 on electro-optic modulator 104. The cancellation of the leakage 116 can be understood as removing the term associated with $B*omi_d$ in the equation (4). The equation then becomes the one describing the ideal EA operation.

In an example embodiment where electro-optic modulator 104 is an electro-absorptive modulator, light signal 222 may be influenced by operation of electro-optic modulator 104. In operation, an electro-absorptive modulator absorbs a percentage of an input light signal and converts the light signal to an electrical current. The electrical current may then influence the operation of the electro-absorptive modulator. In the system illustrated in FIG. 2, electro-optic modulator 104 would absorb part of light signal 220 which would be converted to electrical current. This electrical current would influence the operation of electro-optic modulator 104 such that light signal 222 would be created by modifying light signal 220 as influenced by information signal 110, dithering tone leakage 116, and electrical current absorbed from light signal 220 by electro-optic modulator 104.

First signal modification device 208 is additionally operable to cancel the interferences described above. The absorptive interference is caused by absorption of light signal 220 by electro-optic modulator 104. Ideally, light signal 220 is based on dithering tone 108, as a result, the electric current absorbed by electro-optic modulator 104 is based on dithering tone 108 and can be cancelled by first signal modification device 208 by the same process that first signal modification device 208 cancels dithering tone leakage 116 with first noise cancellation signal 212.

Figure 3A:
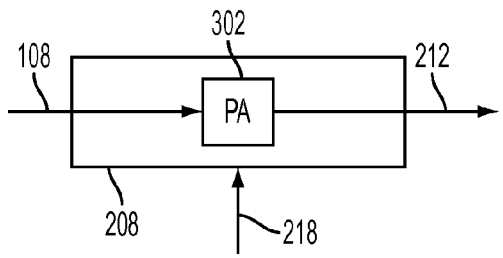
FIG. 3A illustrates an example signal modification device.

FIG. 3A illustrates an example signal modification device capable to modify an input signal via phase adjustment.

In the example embodiment of FIG. 3A, first signal modification device 208 includes phase adjusting portion 302. First signal modification device 208 takes as input dithering tone 108 and first control signal 218 and outputs first cancellation signal 212. Phase adjusting portion 302 is operable to modify dithering tone 108 in accordance with first control signal 218 to create first cancellation signal 212. Phase adjustment may also be derived by using other system parameters.

Figure 3B:
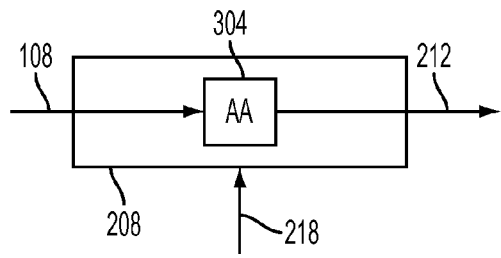
FIG. 3B illustrates an example signal modification device.

FIG. 3B illustrates an example signal modification device capable to modify an input signal via amplitude adjustment.

In the example embodiment of FIG. 3B, first signal modification device 208 includes amplitude adjusting portion 304. First signal modification device 208 takes as input dithering tone 108 and first control signal 218 and outputs first cancellation signal 212. Amplitude adjusting portion 304 is operable to modify dithering tone 108 in accordance with first control signal 218 to create first cancellation signal 212. Amplitude adjustment may also be derived by using other system parameters.

Figure 3C:
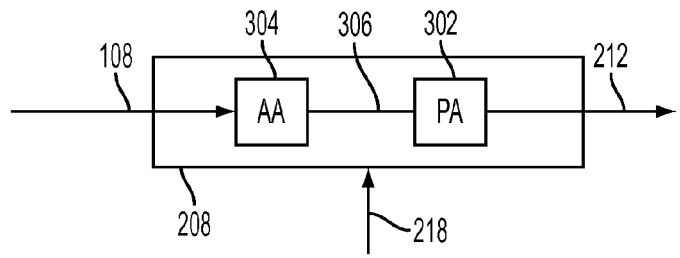
FIG. 3C illustrates an example signal modification device.

FIG. 3C illustrates an example signal modification device capable to modify an input signal via phase and amplitude adjustment.

In the example embodiment of FIG. 3C, first signal modification device 208 includes phase adjusting portion 302 and amplitude adjusting portion 304. First signal modification device 208 takes as input dithering tone 108 and first control signal 218 and outputs first cancellation signal 212. Amplitude adjusting portion 304 is operable to modify dithering tone 108 in accordance with first control signal 218 to create modified signal 306. Phase adjusting portion 302 is operable to modify modified signal 306 in accordance with first control signal 218 to create first cancellation signal 212.

In the example embodiment of FIG. 3C, amplitude adjusting portion 304 acts on dithering tone 108 before phase adjusting portion 302. In other embodiments, other arrangements of amplitude adjusting portion 304 and phase adjusting portion 302 are possible.

Figure 4A:
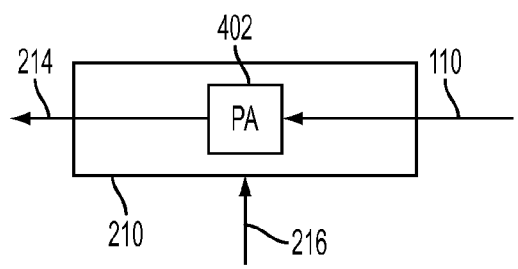
FIG. 4A illustrates an example signal modification device.

FIG. 4A illustrates an example signal modification device capable to modify an input signal via phase adjustment.

In the example embodiment of FIG. 4A, second signal modification device 210 includes phase adjusting portion 402. Second signal modification device 210 takes as input information signal 110 and second control signal 216 and outputs second cancellation signal 214. Phase adjusting portion 402 is operable to modify information signal 110 in accordance with second control signal 216 to create second cancellation signal 214. Phase adjustment may also be derived by using other system parameters.

Figure 4B:
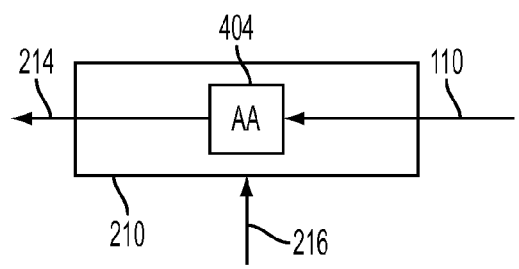
FIG. 4B illustrates an example signal modification device.

FIG. 4B illustrates an example signal modification device capable to modify an input signal via amplitude adjustment.

In the example embodiment of FIG. 4B, second signal modification device 210 includes amplitude adjusting portion 404. Second signal modification device 210 takes as input information signal 110 and second control signal 216 and outputs second cancellation signal 214. Amplitude adjusting portion 404 is operable to modify information signal 110 in accordance with second control signal 216 to create second cancellation signal 214. Amplitude adjustment may also be derived by using other system parameters.

Figure 4C:
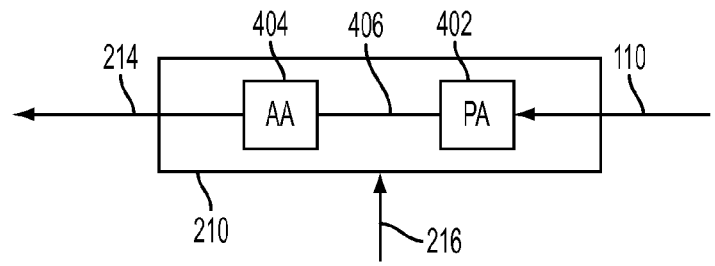
FIG. 4C illustrates an example signal modification device.

FIG. 4C illustrates an example signal modification device capable to modify an input signal via phase and amplitude adjustment.

In the example embodiment of FIG. 4C, second signal modification device 210 includes phase adjusting portion 402 and amplitude adjusting portion 404. Second signal modification device 210 takes as input information signal 110 and second control signal 216 and outputs second cancellation signal 214. Phase adjusting portion 402 is operable to modify information signal 110 in accordance with second control signal 216 to create modified signal 406. Amplitude adjusting portion 404 is operable to modify modified signal 406 in accordance with second control signal 216 to create second cancellation signal 214.

In the example embodiment of FIG. 4C, phase adjusting portion 402 acts on information signal 110 before amplitude adjusting portion 404. In other embodiments, other arrangements of amplitude adjusting portion 404 and phase adjusting portion 402 are possible.

In accordance with conventional, electro-absorption lasers (EMLs) experience leakage between input electrical signals, which severely limits performance when operating with analog input signals. Interference resulting from leakage of analog signals may result in clipping or distortion of the output of the EML or additional noises in the transmission network. EMLs, which take as input digital signals, are also affected by leakage. However, since there are only two output signals, the system is more tolerant to interference.

In accordance with aspects of the present invention, filters may be added to an EML to reduce or cancel the leakage in the EML with negative interference. The filters may be controlled via existing elements of an EML to modify the input signals to generate the negative interference. This allows the EML to operate on a much wider variety of signals and the EML is operable to transmit information signals over much longer distances.

The filters may modify the signals to create negative interference by any known method, including but not limited to phase modification, amplitude modification, and frequency modification.

As a result of the aspects of the present invention, the system may reduce the mutual leakage in an EML via negative interference, allowing for better signal transmission and improved signal transmission distance.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a dither tone signal and an information signal, said device comprising:
   a laser diode operable to output a first light signal;
   an electro-optic modulator operable to transmit a second light signal;
   a first filter operable to generate a first filtered signal based on the information signal; and
   a second filter operable to generate a second filtered signal based on the dither tone signal,
   wherein the first light signal is based on the dither tone signal, the information signal and the first filtered signal, said first filter comprising at least one of a first phase adjusting portion, a first amplitude adjusting portion or a first filtering portion, the first phase adjusting portion operable to adjust a phase of the information signal, the first amplitude adjusting portion operable to adjust an amplitude of the information signal, and the first filtering portion operable to pass the information signal and attenuate other signals, and
   wherein the second light signal is based on the first light signal, the information signal, the dither tone signal and the second filtered signal.

2. The device of claim 1,
   wherein said laser diode is operable to output the first light signal based on a first interference signal caused by the information signal,
   wherein the first interference signal has a first interference signal phase and a first interference signal amplitude.

3. The device of claim 2, further comprising a photo detecting device operable to output a first instruction signal based on the first light signal.

4. The device of claim 3,
wherein said first filter comprises said first phase adjusting portion, and
wherein said first phase adjusting portion is operable to adjust the phase of the information signal, in an amount based on the first instruction signal, such that the first filtered signal negatively interferes with the first interference signal.

5. The device of claim 4,
wherein said first filter additionally comprises said first amplitude adjusting portion, and
wherein said first amplitude adjusting portion is operable to adjust the amplitude of the information signal, in an amount based on the first instruction signal, such that the first filtered signal negatively interferes with the first interference signal.

6. The device of claim 3,
wherein said first filter comprises said first amplitude adjusting portion, and
wherein said first amplitude adjusting portion is operable to adjust the amplitude of the information signal, in an amount based on the first instruction signal, such that the first filtered signal negatively interferes with the first interference signal.

7. The device of claim 3, further comprising an optical receiver operable to generate photocurrent based on the second light signal and to output a first instruction signal based on the second light signal.

8. A device for use with a dither tone signal and an information signal, said device comprising:
a laser diode operable to output a first light signal;
an electro-optic modulator operable to transmit a second light signal;
a first filter operable to generate a first filtered signal based on the information signal; and
a second filter operable to generate a second filtered signal based on the dither tone signal,
wherein the first light signal is based on the dither tone signal, the information signal and the first filtered signal,
wherein the second light signal is based on the first light signal, the information signal, the dither tone signal and the second filtered signal, said second filter comprising at least one of a second phase adjusting portion, a second amplitude adjusting portion or a second filtering portion, the second phase adjusting portion operable to adjust the phase of the dither tone signal, the second amplitude adjusting portion operable to adjust the amplitude of the dither tone signal, and the second filtering portion operable to pass the dither tone signal and attenuate other signals.

9. The device of claim 8,
wherein said electro-optic modulator is operable to transmit the second light signal based on a second interference signal caused by the dither tone signal,
wherein the second interference signal has a second interference signal phase and a second interference signal amplitude.

10. The device of claim 9, further comprising:
a detecting device,
wherein said electro-optic modulator is operable to generate photocurrent based on the first light signal, and
wherein said detecting device is operable to output a second instruction signal based on the photocurrent.

11. The device of claim 10,
wherein said second filter comprises said second phase adjusting portion, and
wherein said second phase adjusting portion is operable to adjust the phase of the dither tone signal, in an amount based on the second instruction signal, such that the second filtered signal negatively interferes with the second interference signal.

12. The device of claim 11,
wherein said second filter additionally comprises said second amplitude adjusting portion, and
wherein said second amplitude adjusting portion is operable to adjust the amplitude of the dither tone signal, in an amount based on the second instruction signal, such that the second filtered signal negatively interferes with the second interference signal.

13. The device of claim 10,
wherein said second filter comprises said second amplitude adjusting portion, and
wherein said second amplitude adjusting portion is operable to adjust the amplitude of the dither tone signal, in an amount based on the second instruction signal, such that the second filtered signal negatively interferes with the second interference signal.

14. The device of claim 10,
wherein said electro-optic modulator comprises an electro-absorption modulator operable to absorb a first amount of the first light signal based on the information signal and to transmit a second amount of the first light signal based on the information signal, and
wherein the first amount of the first light signal absorbed by said electro-absorption modulator creates a third interference signal.

15. The device of claim 14,
wherein said second filter comprises said second phase adjusting portion, and
wherein said second phase adjusting portion is operable to adjust the phase of the dither tone signal, in an amount based on the second instruction signal, such that the second filtered signal negatively interferes with the third interference signal.

16. The device of claim 15,
wherein said second filter additionally comprises said second amplitude adjusting portion, and
wherein said second amplitude adjusting portion is operable to adjust the amplitude of the dither tone signal, in an amount based on the second instruction signal, such that the second filtered signal negatively interferes with the third interference signal.

17. The device of claim 14,
wherein said second filter comprises said second amplitude adjusting portion, and
wherein said second amplitude adjusting portion is operable to adjust the amplitude of the dither tone signal, in an amount based on the second instruction signal, such that the second filtered signal negatively interferes with the third interference signal.

18. The device of claim 10, further comprising an optical receiver operable to generate photocurrent based on the second light signal and to output a first instruction signal based on the second light signal.

19. A method of using a dither tone signal and an information signal, said method comprising:
  outputting, via a laser diode, a first light signal;
  transmitting, via an electro-optic modulator, a second light signal;
  generating, via a first filter, a first filtered signal based on the information signal; and
  generating, via a second filter, a second filtered signal based on the dither tone signal,
  wherein the first light signal is based on the dither tone signal, the information signal and the first filtered signal, said first filter comprising at least one of a first phase adjusting portion, a first amplitude adjusting portion or a first filtering portion, the first phase adjusting portion operable to adjust a phase of the information signal, the first amplitude adjusting portion operable to adjust an amplitude of the information signal, and the first filtering portion operable to pass the information signal and attenuate other signals, and
  wherein the second light signal is based on the first light signal, the information signal, the dither tone signal and the second filtered signal.

20. The method of claim 19, wherein said generating, via a second filter, a second filtered signal based on the dither tone signal comprises adjusting, via a second phase adjusting portion, the phase of the dither tone signal, and adjusting, via a second amplitude adjusting portion, the amplitude of the dither tone signal.

21. A method of using a dither tone signal and an information signal, said method comprising:
  outputting, via a laser diode, a first light signal;
  transmitting, via an electro-optic modulator, a second light signal;
  generating, via a first filter, a first filtered signal based on the information signal; and
  generating, via a second filter, a second filtered signal based on the dither tone signal,
  wherein the first light signal is based on the dither tone signal, the information signal and the first filtered signal,
  wherein the second light signal is based on the first light signal, the information signal, the dither tone signal and the second filtered signal, said second filter comprising at least one of a second phase adjusting portion, a second amplitude adjusting portion or a second filtering portion, the second phase adjusting portion operable to adjust a phase of the dither tone signal, the second amplitude adjusting portion operable to adjust an amplitude of the dither tone signal, and the second filtering portion operable to pass the dither tone signal and attenuate other signals.

22. The method of claim 21, wherein said generating, via the first filter, a first filtered signal based on the information signal comprises adjusting, via a first phase adjusting portion, the phase of the information signal, and adjusting, via, the amplitude of the information signal.

* * * * *